United States Patent [19]

Lee

[11] Patent Number: 5,411,285
[45] Date of Patent: May 2, 1995

[54] REAR SUSPENSION FOR VEHICLE

[75] Inventor: Unkoo Lee, Kyungki-do, Rep. of Korea

[73] Assignee: Hyundai Motor Company, Seoul, Rep. of Korea

[21] Appl. No.: 156,717

[22] Filed: Nov. 24, 1993

[30] Foreign Application Priority Data

Nov. 24, 1992 [KR] Rep. of Korea .................. 92-22194

[51] Int. Cl.[6] ............................................. B60G 3/00
[52] U.S. Cl. .................................. 280/701; 280/710
[58] Field of Search ............... 280/690, 696, 701, 710, 280/663, 666, 667, 670

[56] References Cited

U.S. PATENT DOCUMENTS 5,080,389  1/1992  Kawano et al. ................. 280/701
5,197,755  3/1993  Quick ............................... 280/701

Primary Examiner—Kenneth R. Rice
Attorney, Agent, or Firm—Birch, Stewart, Kolasch & Birch

[57] ABSTRACT

A rear suspension for a vehicle which absorbs both a large shock and minute vibration includes a shock-absorbing device having a vehicle body-side end connected with a central portion of a sub-frame and a wheel-side end connected with an upper end of a vertical arm, the shock-absorbing member being disposed transversely with respect to the vehicle body. A lower arm includes an operating hole penetrating a central portion of the lower arm, a sliding groove formed in the operating hole, and a roller slidably disposed on the sliding groove, the front end of the horizontal arm being connected with a central portion of the lower arm by the roller.

5 Claims, 3 Drawing Sheets

REAR SUSPENSION FOR VEHICLE

BACKGROUND OF THE INVENTION

1. Field of the Invention

The present invention relates to a rear wheel suspension for a vehicle and, more particularly, to a suspension which can enhance riding comfort by absorbing vibration generated when a wheel moves upward and downward by means of a shock-absorbing member, and which can cope with shock and minute vibration by making a displacement of the shock-absorbing member larger than that of a wheel.

2. Description of Related Art

In general, a conventional vehicle suspension connects an axle shaft and a vehicle body to each other and absorbs an impact and vibration from a road surface to increase riding comfort and running safety. To absorb the impact from the road surface, a connection between upper and lower parts should be flexible, and to cope with driving and breaking forces applied to a wheel and a centrifugal force in a vehicle's turning, a connection in a horizontal direction of the suspension should be durable.

Suspension systems are structurally characterized as an integral shaft suspension and an independent suspension. The suspension of this invention concerns the independent suspension. These include the McPherson strut type suspension and Wishbone type suspensions.

The McPherson strut type suspension system comprises a strut arm 55, a shock-absorbing means, consisting of a shock absorber 51 and a spring 52 and having a lower part fixed to a wheel carrier 53 pivotally supporting a wheel 50 and an upper part supported by a vehicle body; and a lower control arm 56 connecting the lower part of the wheel carrier 53 to the lower part of the vehicle body, as shown in FIG. 4A.

The Wishbone type suspension system, as shown in FIG. 4B, includes the wheel carrier 53 supporting the wheel 50 and having the upper and lower parts connected to a sub-frame 54 of a car body by the upper and lower control arms 57 and 58, respectively, and a spring 59, as an absorbing means, disposed between the upper and lower control arms.

The above-mentioned two kinds of the conventional suspension systems include in common an absorbing member mounted vertically or inclined a little, such that the shock applied from the wheel is directly transmitted to the shock-absorber member, whereby the suspensions have problems that there is a limit to the release of the shock and the enhancement in the riding comfort which place restrictions on the layout of the suspension system.

In addition, the suspension system is designed to have a spring rate of the shock-absorbing member larger than a wheel rate or a suspension rate, and the controlling function against the minute displacement is not precise at an initial stage. Thus, the conventional suspension systems have a problem of not being able to cope with minute vibration.

SUMMARY OF THE INVENTION

Accordingly, the present invention has been made in an effort to solve the above-described problems.

It is an object of the present invention to provide a rear suspension system which can enhance riding comfort by absorbing vibration during a vehicle's up-and-down movement by means of a shock-absorbing member disposed in a transverse direction with respect to a vehicle body.

It is another object of the present invention to provide a rear suspension system which can cope with a shock and minute vibration by making a displacement of the shock-absorbing member larger than that of a wheel.

To achieve the above objects, the present invention provides a rear suspension for a vehicle, the vehicle having a front side, a rear side, a left side, a right side, and a longitudinal axis, the rear suspension comprising: a sub-frame having wing portions formed on both ends of the sub-frame; a wheel carrier for supporting a wheel; an upper arm for connecting an upper part of the wheel carrier to the wing portion of the sub-frame; a lower arm for connecting a lower part of the wheel carrier to a lower part of the sub-frame; a rotating member including a horizontal arm, a vertical arm, and a bent portion, the bent portion being connected with a bracket formed on a central part of the wing portion by hinge, a front end of the horizontal arm being connected with a central portion of the lower arm; and a shock-absorbing means having a vehicle body-side end connected with a central portion of the sub-frame and a wheel-side end connected with an upper end of the vertical arm, the shock-absorbing means being disposed transversely with respect to the vehicle body.

The lower arm comprises an operating hole penetrating a central portion of the lower arm, a sliding groove formed in the operating hole, and a roller slidably disposed on the sliding groove, the front end of the horizontal arm being connected with a central portion of the lower arm by the roller.

The vertical arm is longer than the horizontal arm.

A formula, $F_2/F_1 * a/b < 1$, is satisfied, where, $F_1$ is a force of a shock transmitted to the wheel from a road surface, $F_2$ is a vertical force of the front end of the horizontal arm of the rotating member, $a$ is a length of the horizontal arm of the rotating member, and $b$ is a length of the vertical arm of the rotating member.

The shock-absorbing means is disposed so that the vehicle body-side end is lower than the wheel-side end.

The shock-absorbing means is formed by uniting a shock-absorber and a spring.

The spring rate of the spring is larger than a wheel rate.

BRIEF DESCRIPTION OF THE DRAWINGS

Further objects and other advantages of the invention will become apparent from the following description in conjunction with the attached drawings, in which.

DETAILED DESCRIPTION OF PREFERRED EMBODIMENTS

Figure 1:
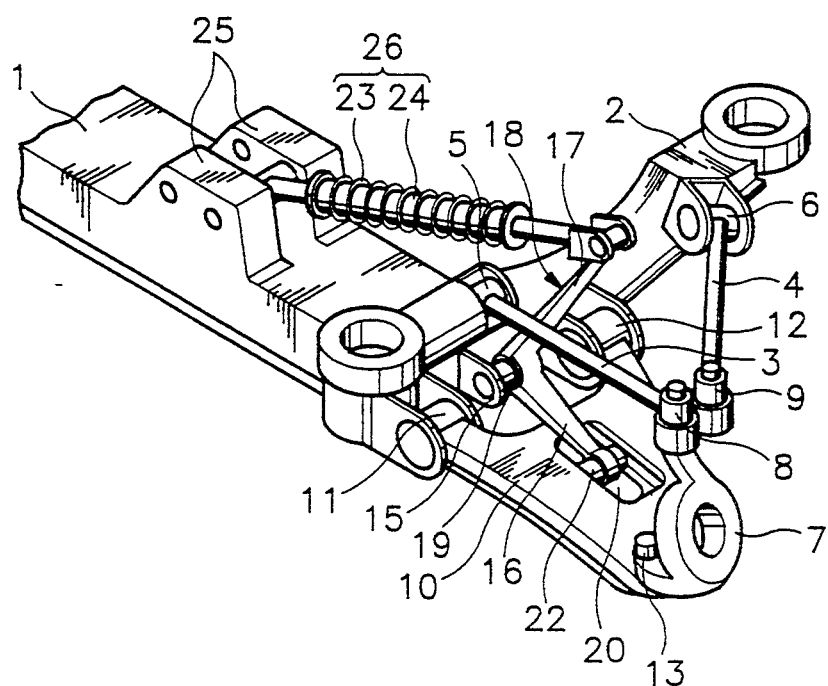
FIG. 1 is a perspective view of a rear suspension in accordance with an embodiment of the present invention.
Figure 2:
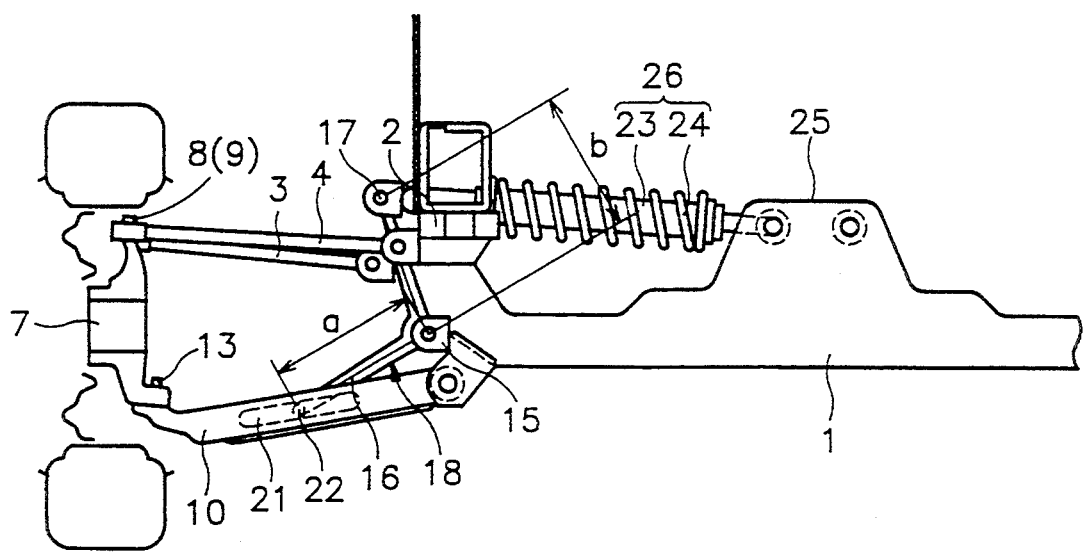
FIG. 2 is a rear view of a rear suspension in accordance with an embodiment of the present invention.

FIGS. 1 and 2 are respectively a perspective view and a rear view in accordance with an embodiment of a suspension system of the present invention, wherein wing portion 2 is formed longitudinally with respect to a vehicle body on both ends of a sub-frame 1. The vehicle body lies on the wing portion 2. The suspension is disposed at an outer side of the wing portion 2. In FIGS. 1 and 2, disposition of the suspension system as to a left-rear wheel is illustrated.

Further, a pair of upper arms 3 and 4 connecting an upper part of a wheel carrier to the sub-frame, include vehicle body-side connecting portions 5 and 6 respectively connected with front and rear parts of the wing portion 2 by an elastic bushing and wheel-side connecting portions 8 and 9 which are focused at the same horizontal plane and are connected with an upper part of a wheel carrier 7 by a ball joint. Accordingly, an interval of the vehicle body-side connecting portions 5 and 6 is considerably larger than that of the wheel side connecting portion 8 and 9.

A lower arm 10 connecting a lower part of the wheel carrier to the sub-frame includes vehicle body-side connecting portions 11 and 12, which are formed by being diverged from a central portion of the lower arm 10, connected with the sub-frame by an elastic bushing and a wheel-side connecting portion 13 connected with the lower part of the wheel carrier 7 by a ball joint.

A rotating member 18 is formed in an L-shape such that the rotating member includes a horizontal arm 16, a vertical arm 17, and a bent portion 19. The bent portion 19 is connected with a bracket 15 formed on a central part of the wing portion 2 by a hinge.

A front end of the horizontal arm 16 of the rotating member 18 is connected with a roller 22 which is inserted in a sliding groove 21 which is formed inside an operating hole 20 penetrating a center portion of the lower arm 10.

Accordingly, the rotating member 18 turns upward and downward around the roller 22 which slides along the sliding groove 21 in accordance with an up-and-down movement of the lower arm 10.

Further, an upper end of the vertical arm 17 of the rotating member is rotatably connected with a wheel side-end of a strut assembly 26 which will be described below.

The strut assembly 26 disposed in a transverse direction with respect to the vehicle body consists of a spring 23 and a shock absorber 24. A vehicle body-side end of the strut assembly is connected with a bracket 25 projecting on a central portion of the sub-frame 1.

The wheel-side end of the strut assembly is higher than the vehicle body-side end of the strut assembly such that the strut assembly can absorb a shock applied through the rotating member 18.

In the rotating member 18, the length b of the vertical arm 17 is longer than the length a of the horizontal arm 16, such that the length ratio b/a is larger than 1.

The reason why the length b of the vertical arm 17 is longer than length a of the horizontal arm 16 is that a large force which is applied to the front end of the horizontal arm 16 changes in a small force at the front end of the vertical arm 17 by the length ratio b/a therebetween, thereby providing an absorbing operation.

Further, the reason why the front end of the horizontal arm 16 of the rotating member 18 is connected with the roller 22 which is slidably inserted in the sliding groove 21 is that the rotating member 18 can smoothly rotate in accordance with a rotation of the lower arm 10.

Figure 3:
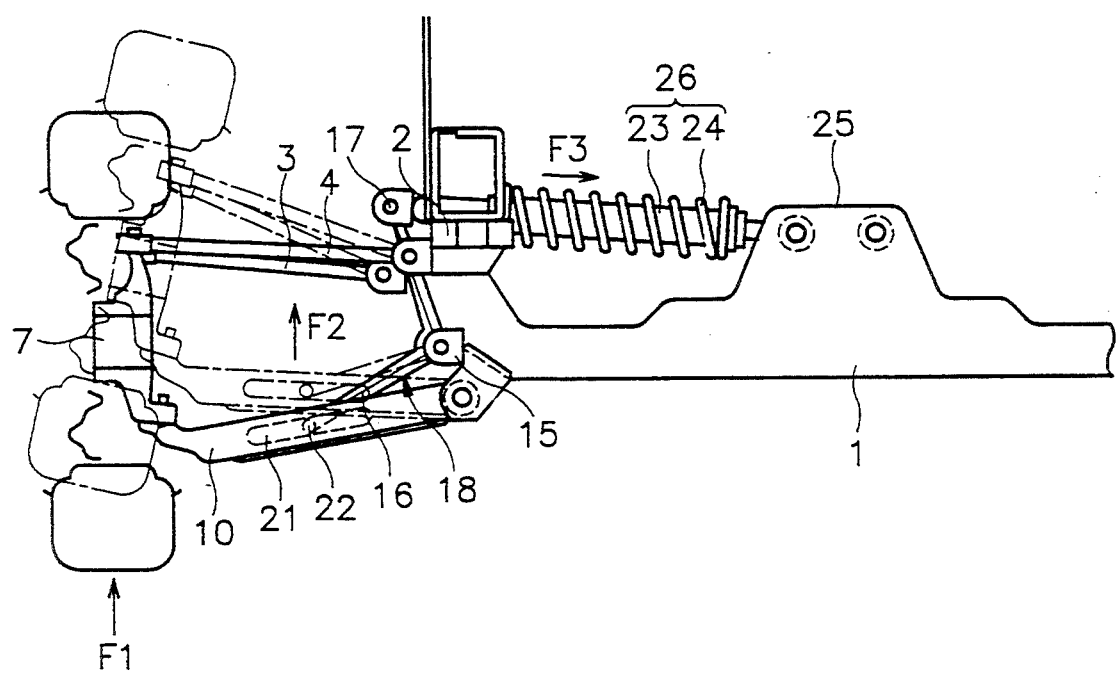
FIG. 3 is a view showing an operating state of a rear suspension in accordance with an embodiment of the present invention.
Figure 4A:
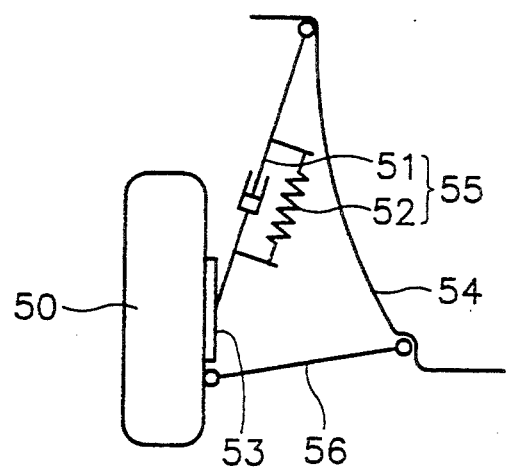
FIG. 4A is a schematic view of a rear suspension in accordance with conventional art.
Figure 4B:
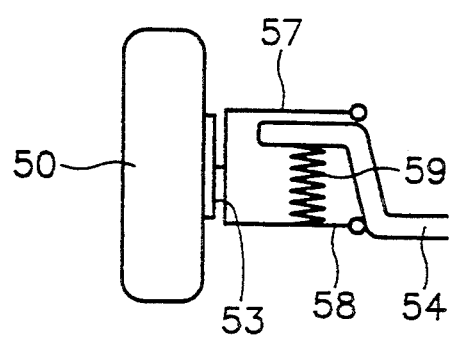
FIG. 4B is a schematic view of a rear suspension in accordance with conventional art.

A force F1 applied to the wheel from the road surface, as shown in FIG. 3, serves as the force for upwardly rotating the wheel and the upper and lower arms 3, 4 and 10. At this point, the force F1 is first absorbed, and the absorbed force F1 is transmitted to the front end of the horizontal arm 16 which is connected with the roller 22, and then acts as a vertical force F2 to upwardly push the front end of the horizontal arm.

The rotating member 18 then turns clockwise, centering the bend portion 19 as a hinge point, by the vertical force F2, and the vertical force F2 is reduced by the length ratio b/a between the horizontal and vertical arms 16 and 17, and transmitted to the strut assembly 26. The reduced force F2 is reduced again by the strut assembly and transmitted to the sub-frame as a force F3.

As described above, the force applied to the road surface is reduced through several steps, and transmitted to the sub-frame 1 in a state that the shock absorbing is finally performed by the strut assembly 26 disposed laterally with respect to the vehicle body. As a result, the impact transmitted to the car body is so small that the riding comfort can be improved.

To obtain the above-described result, it is desirable that $F2/F1 * a/b < 1$ should be satisfied.

Because the strut assembly of the conventional suspension system is disposed vertically with respect to the vehicle body, and the suspension system should be designed to overcome the gravity of the vehicle, the spring rate of the strut assembly must be large. However, in the present invention, because the strut assembly 26 is disposed transversely with respect to the vehicle body, and the rotating member 18 is disposed between the strut assembly 26 and the wheel, the spring rate of the strut assembly 26 may be set small.

Setting the spring rate of the strut assembly 26 small means that the displacement of the strut assembly 26 is larger than the displacement of the wheel during the wheel's up-and-down movement. In conclusion, the suspension system of the vehicle can cope with minute vibration, and has a great effect of controlling slight rolling.

In the case where the wheel moves downward, the force just operates the pertinent components in the contrary direction to that of the above-mentioned operation, and is transmitted to the vehicle body in the same way as the above. Thus, the shock-absorbing effect is the same.

The present invention provides a suspension system which can enhance riding comfort with an absorbing member which is disposed transversely and absorbs vibration during the vehicle's up-and-down movement, and ensures the reduction in shock which affects the vehicle body and can cope with minute vibration by making a displacement of the absorbing member larger than a displacement of a wheel.

Although preferred embodiments of the present invention have been described in detail hereinabove, it should be clearly understood that many variations and/or modifications of the basic inventive concepts herein taught which may appear to those skilled in the pertinent art will still fall within the spirit and scope of the present invention, as defined in the appended claims.

What is claimed is:

1. A rear suspension for a vehicle, the vehicle having a front side, a rear side, a left side, a right side, and a longitudinal axis, the rear suspension comprising:
- a sub-frame having wing portions formed on both ends of the sub-frame;
- a wheel carrier for supporting a wheel;
- an upper arm for connecting an upper part of the wheel carrier to the wing portion of the sub-frame;
- a lower arm for connecting a lower part of the wheel carrier to a lower part of the sub-frame;
- a rotating member including a horizontal arm, a vertical arm, and a bent portion, the bent portion being connected with a bracket formed on a central part of the wing portion by a hinge, and a front end of the horizontal arm being connected with a central portion of the lower arm, wherein the lower arm comprises an operating hole penetrating a central portion of the lower arm; a sliding groove formed in the operating hole, and a roller slidably disposed on the sliding groove, the front end of the horizontal arm being connected with a central portion of the lower arm by the roller; and
- shock-absorbing means having a vehicle body-side end connected with a central portion of the sub-frame and a wheel-side end connected with an upper end of the vertical arm, the shock-absorbing means being disposed transversely with respect to the vehicle body.

2. The rear suspension of claim 1, wherein the vertical arm is longer than the horizontal arm.

3. The rear suspension of claim 1, wherein the shock-absorbing means is disposed such that the vehicle body-side end is lower than the wheel-side end.

4. The rear suspension of claim 1, wherein the shock-absorbing means is formed by uniting a shock absorber and a spring.

5. The rear suspension of claim 4, wherein a spring rate of the spring is larger than a wheel rate.

* * * * *